(12) United States Patent
Shafry

(10) Patent No.: US 6,364,393 B1
(45) Date of Patent: Apr. 2, 2002

(54) DEVICE FOR FIXING A VEHICLE SEAT

(76) Inventor: Gavriel Shafry, Beethovenstrasse 15, 58540, Meinerzhgen (DE)

(*) Notice: Subject to any disclaimer, the term of this patent is extended or adjusted under 35 U.S.C. 154(b) by 0 days.

(21) Appl. No.: 09/646,146

(22) PCT Filed: Mar. 5, 1999

(86) PCT No.: PCT/EP99/01443

§ 371 Date: Sep. 13, 2000

§ 102(e) Date: Sep. 13, 2000

(87) PCT Pub. No.: WO99/47377

PCT Pub. Date: Sep. 23, 1999

(30) Foreign Application Priority Data

Mar. 13, 1998 (DE) .......................................... 298 04 542

(51) Int. Cl.⁷ .............................. B60N 2/02; B60N 2/04
(52) U.S. Cl. ............................... 296/65.03; 248/503.1; 297/331
(58) Field of Search .................... 276/65.03; 248/503.1; 297/336, 331

(56) References Cited

U.S. PATENT DOCUMENTS

| | | | | |
|---|---|---|---|---|
| 2,589,922 | A | * 3/1952 | Bowman | .................. 296/65.03 |
| 4,773,693 | A | 9/1988 | Premji et al. | |
| 5,482,345 | A | 1/1996 | Bolsworth et al. | |

FOREIGN PATENT DOCUMENTS

| | | |
|---|---|---|
| EP | 397333 | 4/1990 |
| EP | 545743 | 10/1992 |
| EP | 546908 | 12/1992 |
| EP | 602696 | 11/1993 |
| EP | 609130 | 1/1994 |
| EP | 622266 | 4/1994 |
| EP | 716950 | 11/1995 |
| EP | 747554 | 5/1996 |
| EP | 863042 | 12/1997 |

* cited by examiner

Primary Examiner—Joseph D. Pape
Assistant Examiner—Hilary Gutman
(74) Attorney, Agent, or Firm—Foley & Lardner

(57) ABSTRACT

A device for detachably mounting an automotive seat to a vehicle floor includes a seat based mounting means configured to cooperate with a floor based retaining piece of the vehicle. The mounting means includes two hinge-connected retaining limbs configured to grasp the floor-based retaining piece in such a manner that, in a first configuration wherein the retaining limbs have been brought together, the mounting means is locked to the floor-based retaining piece. In a second configuration wherein the two retaining limbs are spread apart, the mounting means is separated from the retaining piece. A sleeve-shaped device is configured to slide relative to the retaining limbs wherein in the second configuration of the retaining limbs the retaining limbs are spread apart and wherein the retaining limbs are brought together and held together in their first configuration by sliding the actuating device over the retaining limbs.

2 Claims, 2 Drawing Sheets

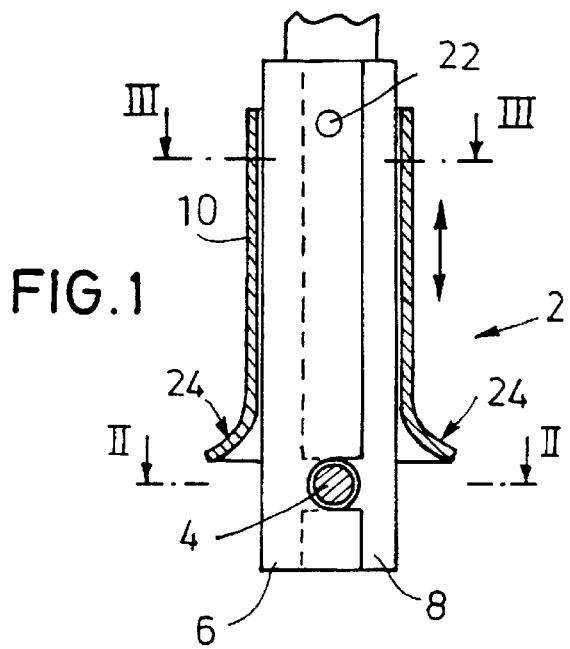
FIG.1
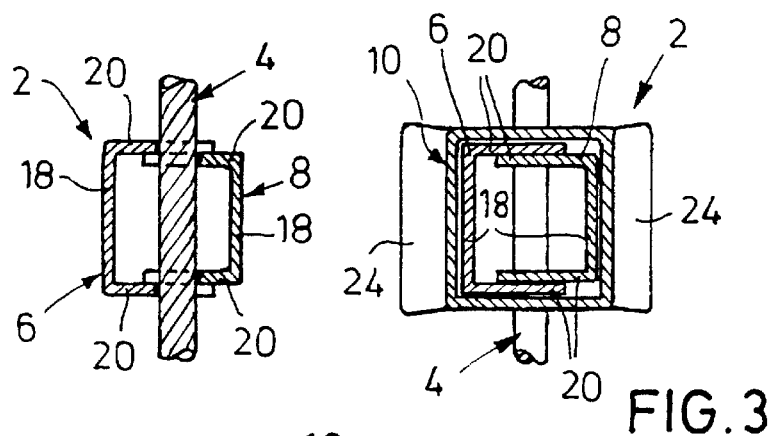
FIG.2
FIG.3
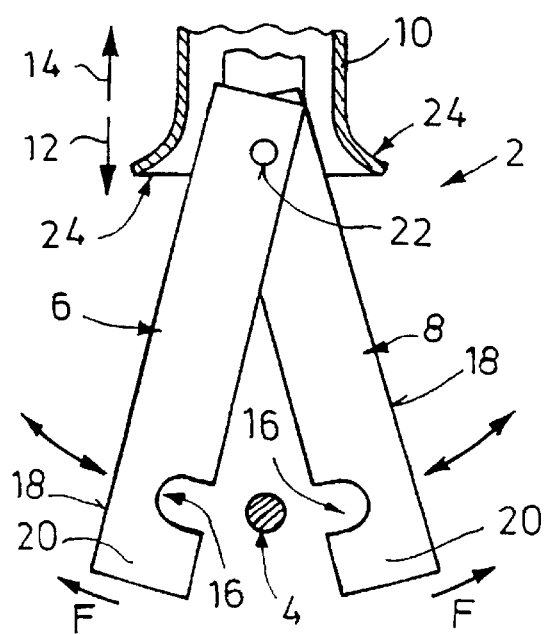
FIG.4

DEVICE FOR FIXING A VEHICLE SEAT

TECHNICAL FIELD OF THE INVENTION

1. Background

The present invention relates to a device for detachably mounting an automotive seat to a vehicle floor, with a seat-based mounting means for cooperating with a floor-based retaining piece of the vehicle, especially a stationary retaining piece.

First, the most various kinds of hook-type connectors are known for the detachable mounting of automotive seats in motor vehicles. Let several publications be referenced here just for sake of example: EP0397333, EP0602696, EP0609130, EP0546908, and EP0622266.

These known mountings have the disadvantage to some extent, that the entire seat must be moved in a particular way for removal or insertion, especially tipped. This is a disadvantage for heavy seats (bench seats) above all.

A mounting is known from both EP0747554 and 0716950, wherein we are dealing with a seat foot lock in the form of a pin-shaped or bolt-shaped fastener, which can be inserted into a retaining hole on the vehicle. At least one lock ball is arranged within the fastener in such a manner, that the lock ball locally projects laterally outwards in the inserted and locked position and engages the rim of the retaining hole. For unlocking, an internal bolt is pulled away from the region of the lock ball, particularly by means of a Bowden cable, so that the lock ball can make way towards the inside, after which the fastener can be removed from the retaining hole. This known device indeed has the advantage that the joint between seat and vehicle basically extends perpendicular to the vehicle floor, wherein we are dealing with simple longitudinal motion without any tipping of the seat. The known device has the disadvantage, however, that it is quite expensive structurally, specifically because a fairly large number of moving parts and spring elements are required.

SUMMARY OF THE INVENTION

U.S. Pat. No. 4,773,693 likewise discloses a seat release mechanism. Two pincer-like hinge-connected retaining limbs are laterally fastened to the seat frame and its end regions are shaped in such a manner, that they interconnect with a retaining piece fastened to the vehicle floor when brought together in the arrested state. The pincer-like retaining limbs are pulled together into the arrested state by a tension spring, for example. A lever, which is shaped into a holding lever, acts against the spring force to release the connection, whereby the retaining limbs spread apart and the retaining piece is released. It is merely the tension spring that arrests this connection. In addition, the user must overcome the spring force in order to release the connection.

U.S. Pat. No. 5,482,345 discloses a ratchet system to arrest or release an automotive seat, especially for a van. This system is also based on two pincer-like retaining limbs that are hinge-connected to each other and cooperate with retaining means fastened to the vehicle floor. Only one retaining limb is swivel-mounted and pressed into the arrested state by a spring force. A Bowden cable moves the movable retaining limb against the spring force to release the connection, so that the pincer-like connection opens. This system is very expensive and here too it is necessary for the user to overcome the spring force to release the connection. Finally, only the spring force causes the arresting.

It is the objective of the present invention to create a device of the generic art, which is distinguished by structural simplicity and also high operational comfort.

This is achieved according to the invention, that the mounting means is designed pincer-like with two hinge-connected retaining limbs, the open end regions of the retaining limbs being designed in adaptation to said floor-based retaining piece in such a manner that, in an arrested state wherein the retaining limbs have been brought together, the mounting means can be connected locking positively with the retaining piece, whereas in a release state wherein the two retaining limbs are spread apart, it can be coupled with the retaining piece or be separated from the retaining piece.

The retaining piece on the vehicle can deal with a bolt-like part, which is basically cylindrical and extends approximately parallel to the vehicle floor, such as a support bow. Ball-shaped or mushroom-shaped retaining pieces would be likewise conceivable. The retaining limbs include receptacles for the retaining piece, wherein the receptacles are located on the open ends of the sides of the retaining limbs that are facing each other and are shaped to fit the contour of the retaining piece in such a manner that, in its arrested state, the holding piece is situated within the two receptacles, locking positively at least locally.

The mounting means according to the invention is designed extraordinarily simply structurally. The two retaining limbs only need to be hinge-connected. Appropriately, the two retaining limbs are each thereby acted upon by an expanding spring force and can be pressed together against the spring force by means of an actuating device. Consequently, only four individual parts are required (two retaining limbs, expanding spring, and actuating device). Appropriately, the actuating device is hereby designed sleeve-shaped and, relative to the retaining limbs, is also guided on them or over them sliding in such a way that, proceeding from the released state wherein the retaining limbs are arranged spread apart with at least their open end regions outside the sleeve-shaped actuating device, the retaining limbs are brought together into their arrested state and held together by pushing the actuating device over them in the direction of their open ends.

According to the invention, the direction of the seat bracket's joint preferably thus corresponds to the actuating device's actuating direction, wherein it is also of special advantage that we are only dealing with linear movements that are basically perpendicular to the vehicle floor. Complicated movements, particularly tipping movements, of the entire seat are hereby avoided, which is of particular advantage in the case of heavy seats (bench seats) above all.

The mounting device according to the invention appropriately only serves for arresting the seat. The carrying force or load-bearing are preferably ensured by separate support pieces (seat feet). But in this case, the mounting device according to the invention can be advantageously integrated into a seat foot. Additionally in this case, remote activation can advantageously be provided, for example by a Bowden cable (a cable where an inner wire transmits force by sliding through an outer flexible sleeve) or similar device.

Additional advantageous design characteristics of the invention are contained in the following description.

BRIEF DESCRIPTION OF THE DRAWINGS

The invention shall be explained in detail below, based on two preferred examples illustrated in the drawing. The drawing shows:

FIG. 1 a partially cut side view of a first embodiment of the mounting device according to the invention, and indeed in the device's arrested state;

FIG. 2 a cross section in the plane II—II depicted in FIG. 1,

FIG. 3 a cross section in the plane III—III depicted in FIG. 1,

FIG. 4 an illustration analogous to FIG. 1, but in the device's release state,

DETAILED DESCRIPTION OF THE INVENTION

Figure 5:
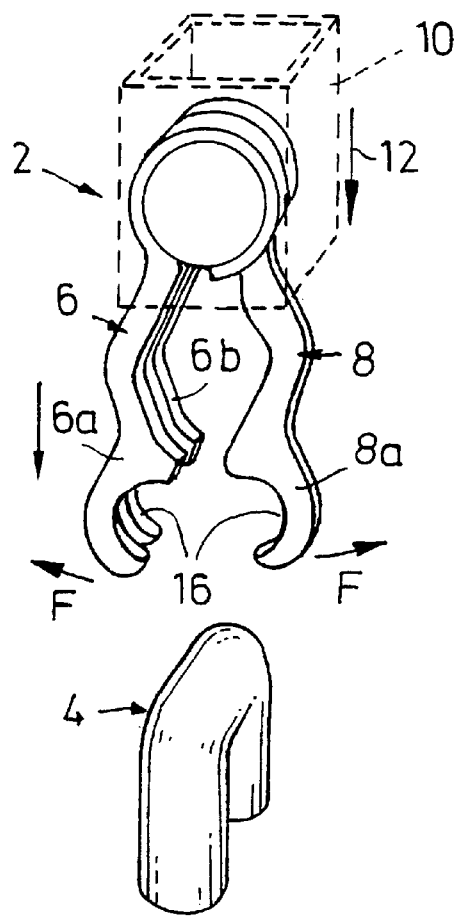
FIG. 5 a schematic perspective illustration of a second embodiment of the device according to invention in its release state and during assembly, and FIG. 6 a schematic partial front view of the embodiment depicted in FIG. 5 in its arrested state.

A device according to invention for detachably mounting an automotive seat to a vehicle floor (seat and floor not illustrated) consists of at least one seat-based mounting means 2, the mounting means cooperating with a retaining piece 4 arranged on the vehicle, especially stationary on the vehicle floor. In the illustrated examples, the retaining piece 4 deals with a bolt-shaped, basically cylindrical part, for example a support bow (see FIG. 5). However, ball sockets or mushroom-headed sockets would also be conceivable.

According to invention, the mounting means 2 is designed according to the art of a pincer with two hinge-connected retaining limbs 6 and 8. The open end regions of these retaining limbs 6, 8 are each designed in adaptation to the contour of the floor-based retaining piece 4 in such a manner that, in an arrested state wherein the retaining limbs 6, 8 have been brought together on the one hand, the mounting means 2 is connected locking positively with said retaining piece 4 (see FIGS. 1 and 6), or on the other hand in a release state wherein the two retaining limbs 6, 8 are spread apart, can be coupled with or separated from the retaining piece 4 (see FIGS. 4 and 5).

Appropriately, the two retaining limbs 6, 8 are each acted upon by an expanding spring force F. An actuating device 10 is hereby provided for pressing together against the spring force F. This actuating device 10 is preferably designed sleeve-shaped and, relative to the retaining limbs 6, 8, is guided on them or over them sliding in such a way that, proceeding from the released state (FIGS. 4 and 5) wherein the retaining limbs 6, 8 are arranged spread apart with at least their open end regions outside the sleeve-shaped actuating device 10, the retaining limbs 6 and 8 are brought together into their arrested state by pushing the actuating device 10 over them in the direction of their open ends (direction of arrow 12) and then also held together arrestingly (FIGS. 1 and 6).

To detach the mounting means 2 from the retaining piece 4, it is only necessary to move (pull) the actuating device 10 away from the retaining limbs 6, 8 in the direction of the arrow 14. The retaining limbs 6 and 8 will spread apart automatically due to the expanding spring force F, whereby they then release the retaining piece 4.

Figure 6:
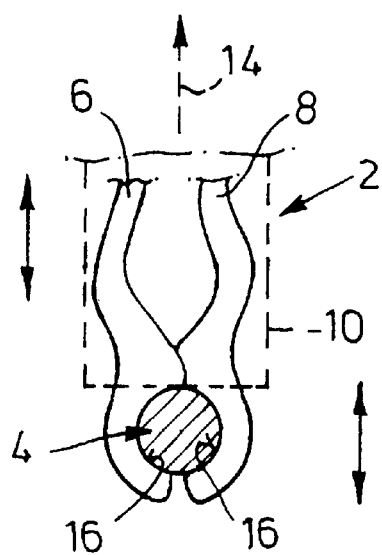

The retaining limbs 6, 8 feature receptacles 16 for the retaining piece 4, the receptacles 16 being formed by indentations or recesses located on the open ends of the sides of the retaining limbs 6, 8 that are opposite and facing each other (FIGS. 4 and 5). These receptacles 16 are shaped to fit the contour of the retaining piece 4 in such a manner that, in the arrested state of the retaining limbs 6, 8, the retaining piece 4 is situated within the two receptacles 16 locking positively at least locally, preferably free from play (FIGS. 1, 2, and 6).

In the invention's first embodiment as depicted in FIGS. 1 through 4, each of the two retaining limbs 6, 8 is designed as a profile section with a basically U-shaped cross section with a floor wall 18 and two side walls 20. In the region of their locally interlocking side walls 20, the two profile sections are linked on one side by a swiveling axis 22 and feature the receptacles 16 that cooperate locking positively with the retaining piece 4 on the other side.

In the example depicted in FIGS. 5 and 6, the one retaining limb 6 consists of (at least) two parallel separated limb pieces 6a and 6b, whereas the other retaining limb 8 features (at least) one corresponding limb piece 8a. Here the limb pieces 6a, b, and 8a of the two retaining limbs 6 and 8 are designed in such a manner and arranged relative to each other in such a manner that, in the arrested state, they locally interlock comblike or locally engage between each other.

As illustrated in FIGS. 1, 2, 3, and 4, the sleeve-shaped actuating device 10 can include funnel-like extensions 24 on its side facing in the direction of the open ends of the retaining limbs 6, 8, that is in the direction of arrow 12, which make it easier to press the retaining limbs 6, 8 together when pushing in the direction 12.

The device according to invention can be manufactured very economically for example out of molded metal parts and/or stampings.

The invention is not limited to the examples illustrated and described, but also includes all embodiments that work in the spirit of the invention. It would therefore also be possible to actuate the pincer-like mounting means by other means. It would be conceivable, for example, to design the mounting means scissor-like and correspondingly actuate it by actuating sections formed as elongations of the retaining limbs, for example by means of a Bowden cable. Furthermore, slopings or bevels would be possible in the region of the receptacles 16 and/or in the open end region, whereby the retaining limbs 6, 8 could be spread apart due to the arrangement on retaining piece 4, by motion in the direction of arrow 12 or 14 alone. A spring force - pressurization could be dispensed with in this case. In this connection, the sleeve-like actuating device 10 would function exclusively as a safety element (locking sleeve) against unintentional release.

Moreover the invention is not limited to the combination of characteristics defined alone but can be also defined by any other arbitrary combination of particular characteristics of all the disclosed individual characteristics as a whole.

I claim:

1. A device for detachably mounting an automotive seat to a vehicle floor comprising:

a seat-based mounting means for cooperating with a floor-based retaining piece of a vehicle, wherein the mounting means includes two hinge-connected retaining limbs configured to grasp the floor-based retaining piece, in a first configuration, wherein the retaining limbs are brought together and the mounting means is locked to the floor-based retaining piece, and in a second configuration, wherein the two retaining limbs are spread apart and the mounting means is separated from the retaining piece; and a sleeve-shaped actuating device configured to slide relative to the retaining limbs wherein in the second configuration the retaining limbs are spread apart and wherein in the first configuration the retaining limbs are brought together and held together by sliding the actuating device over the retaining limbs;

wherein each of the two retaining limbs is designed as a profile section having a basically U-shaped cross section with a floor wall and two side walls wherein, the two profile sections are linked by a swiveling axis.

2. A device for detachably mounting an automotive seat to a vehicle floor comprising:

a seat-based mounting means for cooperating with a floor-based retaining piece of a vehicle, wherein the mounting means includes two hinge-connected retaining limbs configured to grasp the floor-based retaining piece, in a first configuration, wherein the retaining limbs are brought together and the mounting means is locked to the floor-based retaining piece, and in a second configuration, wherein the two retaining limbs are spread apart and the mounting means is separated from the retaining piece; and a sleeve-shaped actuating device configured to slide relative to the retaining limbs wherein in the second configuration the retaining limbs are spread apart and wherein in the first configuration the retaining limbs are brought together and held together by sliding the actuating device over the retaining limbs;

wherein one of the two retaining limbs includes at least two parallel separated limb pieces, whereas the other of the two retaining limbs includes at least one corresponding limb piece, wherein the limb pieces of the two retaining limbs are configured to interlock in a comb like fashion.

* * * * *